(12) United States Patent
Tsuchiya

(10) Patent No.: US 7,802,745 B2
(45) Date of Patent: Sep. 28, 2010

(54) METHOD OF AND SYSTEM FOR WINDING MAGNETIC TAPE ONTO TAPE REEL

(75) Inventor: Hiroyuki Tsuchiya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 225 days.

(21) Appl. No.: 11/949,933

(22) Filed: Dec. 4, 2007

(65) Prior Publication Data
US 2008/0173747 A1 Jul. 24, 2008

(30) Foreign Application Priority Data
Dec. 4, 2006 (JP) ............................. 2006-326585

(51) Int. Cl.
*G11B 15/32* (2006.01)
(52) U.S. Cl. .................................... 242/357
(58) Field of Classification Search ................. 242/333, 242/333.5, 352.3, 357, 413.2, 419.2, 534, 242/534.2, 548.1, 548.2, 536, 537, 364.12, 242/366.2
See application file for complete search history.

(56) References Cited
U.S. PATENT DOCUMENTS

| | | | | |
|---|---|---|---|---|
| 4,408,732 A | * | 10/1983 | Toriumi et al. | 242/357 |
| 4,607,804 A | * | 8/1986 | Urlik | 242/534 |
| 4,826,102 A | * | 5/1989 | Kato et al. | 242/333 |
| 4,909,455 A | * | 3/1990 | Sakaguchi et al. | 242/548.4 |
| 5,533,690 A | * | 7/1996 | Kline et al. | 242/548.2 |
| 6,918,560 B2 | * | 7/2005 | Arai | 242/534 |
| 2003/0189124 A1 | * | 10/2003 | Hayashi et al. | 242/534 |
| 2006/0192045 A1 | * | 8/2006 | Uchiumi et al. | 242/548.1 |

FOREIGN PATENT DOCUMENTS

JP 2005-116093 A 4/2005

* cited by examiner

*Primary Examiner*—William A Rivera
(74) *Attorney, Agent, or Firm*—Young & Thompson

(57) ABSTRACT

A magnetic tape is wound up in a roll on a pate reel without irregular windings in the roll. A rotary shaft with the tape reel coupled thereto is shifted in one direction of tape width is shifted by a predetermined distance until the magnetic tape at its edge is contiguous or subcontiguous to a reel flange to additionally form a predetermined number of turns of the magnetic tape on a magnetic tape roll so as thereby to form an annular peripheral lip portion laterally extending at one side of the magnetic tape roll when the magnetic tape roll grows as large in size as predetermined.

12 Claims, 7 Drawing Sheets

METHOD OF AND SYSTEM FOR WINDING MAGNETIC TAPE ONTO TAPE REEL

BACKGROUND OF THE INVENTION

1. Field of the Invention

The present invention relates to a method of and an apparatus for winding a magnetic tape onto a tape reel which prevents the magnetic tape from being partially irregularly wound and, as a result, forming lateral protrusions in a magnetic tape roll.

2. Description of Related Art

It has been conventional to use magnetic tape cartridges of a helical scan type which are advantageous to the realization of mass storage digital data backup devices for personal computers, workstations and host computers. Single reel magnetic tape cartridges which have a single tape reel contained for rotation in a cartridge case have been known as one of such the magnetic tape cartridges. When loading a magnetic recording equipment with such a single reel magnetic tape cartridge, the magnetic recording equipment draws a magnetic tape out of the single reel magnetic tape cartridge by pulling a leader block at an leading end of the magnetic tape by a tape drive mechanism in order to record information on or to read information from the magnetic tape, and rewinding the magnetic tape onto a tape reel in the magnetic tape cartridge after recording or reading of the information.

Reference is now made to FIGS. 4, 5 and 6A-6C for the purpose of providing a brief background that will enhance an understanding of the present invention. Generally speaking and, as shown in FIG. 4, a single reel magnetic tape cartridge (which is hereinafter refereed to as a magnetic tape cartridge) 100 comprises a plastic cartridge case 10 and a plastic tape reel 40 installed for rotation in the cartridge case 10. The cartridge case 10 is made up of two mating case shell halves, namely a top case shell half 20 and a bottom case shell half 30 coupled together with setscrews. The tape reel 40 is made up of upper and lower flanges 41 and 42. The lower flange 42 comprises a hollow reel hub 421 in the shape of cylindrical core around which a magnetic tape 9 is wound and a flange section 422 which are made as an integral piece. The flange section 422 has a center opening 42B having an inner diameter smaller than a bore diameter of the hollow reel hub 421. The upper flange 41 is fixedly connected to the reel hub 421 by ultrasonic welding. The tape reel 40 is provided with a brake button 52 installed within the hollow reel hub 421 and a reel plate 53 secured to the lower flange section 422. The brake button 52 has a peripheral gear 52A operative as braking means engageable with an internal gear 42A formed at the bottom of the hollow reel hub 421. The magnetic tape cartridge 100 is provided with a coil spring 51 for forcing the brake button 52 into the hollow reel hub 421 until the peripheral gear 52A engages with the internal gear 42A of the hollow reel hub 421 so as thereby to prevent the tape reel 40 from rotating while the magnetic tape cartridge 100 is not in-use. The reel plate 53, which is made of a magnetizable metal, is magnetically attracted by a rotary drive shaft of an external memory device (not shown) when the magnetic tape cartridge 100 is set in the external memory device. The center opening 42B of the flange section 422 permits a brake releasing spindle of a read-write head (not shown) of the external memory device to come into the hollow reel hub 421 and pushes the brake button 52 against the coil spring 51 upward as seen in FIG. 4 so as thereby to disengage the peripheral gear 52A of the brake button 52 from the internal gear 42A of the hollow reel hub 421. In this manner, whenever the magnetic tape cartridge 100 is set in the external memory device, the tape reel 40 is permitted to rotate. The cartridge case 10 has a tape egress/ingress opening 11 located at one corner thereof which permits tape movement into and out of the cartridge interior. A leader block or pin 80 attached to a leading end of the magnetic tape 9 is releasably held in the tape egress/ingress opening 11. This leader block 80 is engaged and pulled out of the tape egress/ingress opening 11 by a drag pin 90 provided on the tape drive unit of the magnetic recording equipment when magnetic tape cartridge 100 is set in the external memory device. The drag pin 90 guides the magnetic tape 9 to a take-up reel (not shown) of the external memory device through the read-write head.

Referring to FIG. 5 showing a magnetic recording equipment 1 for use with in which the magnetic tape cartridge 100 shown in FIG. 4, the magnetic recording equipment 1 comprises a cartridge loading section 2 in which the magnetic tape cartridge 100 is set, a tape winding section 3 in which a take-up reel 6 is installed and a read-write head 7 and is provided with a number of guide rollers 8 for defining a tape path along which a magnetic tape 9 unwound from the in the magnetic tape cartridge 100 is guided to the take-up reel 6. When the magnetic tape cartridge 100 is set in the magnetic recording equipment 1, a tape drive unit (not shown) is activated to bring the drag pin 90 (see FIG. 4) into engagement with the leader block 80 and then pull the drag pin 90 out of the cartridge case 10, and further leads the leader block 80 to the tale-up spool 6. At the same time, the magnetic recording equipment 1 activates a reel drive motor (not shown) to rotate the take-up spool 6. When reaching the take-up reel 6, the leader block 80 is automatically captured in a retaining groove 6b formed in a reel hub 6a of the take-up reel 6. Thereafter, the magnetic tape 9 is wound around the reel hub 6a of the take-up reel 6 by the reel drive motor. The read-write head 7 records signals on the magnetic tape 9 or reads signals recorded on the magnetic tape 9 when the read-write head 7 is passed through by the magnetic tape 9.

Meanwhile, when winding a magnetic tape 9 supplied from a stock magnetic tape (which is called a pancake) on the tape reel 40 in the cartridge case 10, it is always intended to center a magnetic tape roll on the reel hub 421 of the tape reel 40 so as to left spaces or clearances between the magnetic tape roll and the upper and lower flanges 41 and 42, respectively. The problem that arises in winding the magnetic tape 9 on the tape reel 40 is what is called "irregular winding." The term "irregular winding" as used herein shall mean and refer to a partial lateral protrusion of tape edge of the magnetic tape 9 from a side surface of a magnetic tape roll. The irregular winding occurs resulting from that the magnetic tape partly runs off the side surface of a magnetic tape roll at an edge due to a change in tension of the magnetic tape 9 following a decline in winding speed more specifically shown in FIGS. 6A to 6C.

Generally, tape winding is performed in such a winding pattern as initially caries out acceleration of a winding rate to a predetermined maximum rate at the beginning of winding, continues steady winding at the maximum rate and finally declines the winding rate as coming to the end of winding. The magnetic tape waggles or protrudes sideways due to changes in tension which occur correspondingly to the winding pattern. Such a change in tension is one of causes of irregular winding. In particular, since a change in tension becomes larger as the end of winding approaches, i.e. as a diameter of the magnetic tape roll becomes larger, the irregular winding takes place under the greater influence of a change in tension as the end of winding approaches as denoted by a reference sign 9a in FIG. 6A. It has been made appear that the irregularly-wound portion 9a of the magnetic tape roll could cause problems upon dropping of the magnetic tape cartridge 100 from above. For example, as shown in FIG. 7, if the magnetic tape cartridge 100 falls down against a horizontal surface such as a floor or a ground with the tape reel 40 kept in a horizontal position, the tape reel 40 receives strong impact T on the flanges 41 and 42 through the irregularly-wound portion 9a of the magnetic tape roll. As a result, the flanges 41 and 42 are instantaneously but greatly deflected in an axial direction of the reel hub 421. At the moment of this deflection, the upper flange 41 hardly hits against the irregularly wound portion 9a of the magnetic tape roll and folds down or damages a tape edge of the irregularly-wound portion 9a of the magnetic tape roll as shown in FIG. 6B. The tape edge folded down once is incapable of restoring its original state and remains folded or broken eve though the upper flange 41 is relieved of the impact T as shown in FIG. 6C.

The magnetic tape with its edge partially damaged wobbles sideways in the direction of tape width at the damaged portions due to sliding on the circumferential surfaces of the guide rollers 8 during movement in the tape path defined by the guide rollers 8 and, as a result of the edge damage, the read-write head 7 deviates off a recording track of the magnetic tape 9. Such tracking errors encountered by the magnetic tape 9 occur for the following reasons (1) and (2).

(1) When a lateral protruding edge of a magnetic tape caused due to irregular winding folds down, it is not improbable that a tape drive unit fails to detect a magnetic signal recorded on the magnetic tape in close vicinity to a tape edge which indicates a tape position.

(2) The fault of positional signal detection brings the magnetic tape to a halt or brings about a reduction in recording capacity.

For these reasons, it is conventional to restrain a sideways wobble of a magnetic tape by use of guide rollers while winding the magnetic tape onto a tape reel in order to prevent an occurrence of irregular windings. In other words, it has been thought that it is essential to contrive formation of a magnetic tape roll in a regular even form which has even side surfaces without protrusions of tape edge. For example, as described in Japanese Unexamined Patent Publication No. 2005-116093, a magnetic tape deed device is provided with a tape displacement detection means for detecting a displacement in a lateral direction of width of a magnetic tape and providing an output signal representative of the lateral displacement for a tape position correction means. The tape position correction means thrusts back the magnetic tape in an opposite lateral direction of width according to the output signal so as thereby to bring back the magnetic tape into a given path. The magnetic tape deed device is quite successful in forming a magnetic tape roll in a regular even form but has problems with the need for a tape displacement detection sensor and a displacement feedback circuit which derives up costs of the magnetic tape deed device and the need for such sophisticated winding control as is continued from beginning to end of winding of a tape onto a tape reel.

SUMMARY OF THE INVENTION

It is therefore an object of the present invention to provide a method of and an apparatus for winding a magnetic tape onto a tape reel which obviates the need for each and every one of a tape displacement sensor and a displacement feedback circuit which drives down costs of the apparatus.

The aforesaid object of the present invention is accomplished by a magnetic tape winding apparatus which comprises a rotary shaft movable in opposite axial directions thereof to which a tape reel is detachably coupled, driving means for driving the rotary shaft in a home position to wind a magnetic tape onto the tape reel roll length detection means for detecting a roll length of magnetic tape roll growing on the tape reel, and shifting means for shifting an axial position of the rotary shaft in either axial direction from the home position. The shifting means is caused to shift the rotary shaft in one of the opposite axial directions from the home position by a predetermined distance until the magnetic tape at its edge is either contiguous or subcontiguous to the flange of the tape reel to additionally form a predetermined number of turns of the magnetic tape on a predetermined roll length of magnetic tape roll so as thereby to form an annular peripheral lip portion laterally extending at one of opposite sides of the predetermined roll length of magnetic tape roll when the roll length detection means detects the predetermined roll length of magnetic tape roll, and the driving means is stopped when the predetermined number of turns of the magnetic tape are formed. The roll length detection means is desirably adapted to detect an outermost turn of the predetermined roll length of magnetic tape roll when it comes level with an outer edge of the flange of the tape reel and further to provide a signal with which the shift means is electrically activated to shift the rotary shaft when detecting the predetermined roll length of magnetic tape roll.

The same annular peripheral lip portion may be formed at the other side of the magnetic tape roll by causing the shifting means to shift the rotary shaft from the home position in the other axial direction by the predetermined distance. The rotary shaft may be shifted while keeping rotation thereof. Furthermore, the shift means comprises an electrically actuated slider to which the rotary shaft is mounted for rotation.

The magnetic tape winding method comprises the steps of driving a rotary shaft in home position to wind the magnetic tape onto a tape reel coupled to the rotary shaft, shifting an axial position of the rotary shaft in either axial direction of a rotational axis of the rotary shaft from the home position by a predetermined distance, desirably until the magnetic tape at its edge is made contiguous or subcontiguous to the flange of the tape reel to additionally form a predetermined number of turns of the magnetic tape on the predetermined roll length of magnetic tape roll so as thereby to form an annular peripheral lip portion extending at one of opposite sides of the predetermined roll length of magnetic tape roll when detecting a predetermined roll length of magnetic tape roll growing on the tape reel, and stopping the rotary shaft when the predetermined number of turns of the magnetic tape are formed. The magnetic tape winding method may further comprises shifting the rotary shaft from the home position in the other axial direction by the predetermined distance to additionally form the predetermined number of turns of the magnetic tape as another annular peripheral lip portion extending at the other side of the predetermined roll length of magnetic tape roll.

According to the present invention, when a predetermined length of magnetic tape is wound onto a tape reel, the rotary shaft with the reel tape coupled thereto is shifted in a direction of tape width so as thereby to force the magnetic tape to shift in position until the magnetic tape at its edge is made contiguous or subcontiguous to a flange of the tape reel. In this position, the magnetic tape is further wound by a predetermined number of turns so as to form an annular peripheral lip portion extending at one of opposite sides of the magnetic tape roll. The annular peripheral lip portion prevents irregularly wound magnetic tapes protruding laterally from the side surface of the magnetic tape roll from damaged at tape edges by the flange of the tape reel. In consequence, the magnetic tape winding device is provided without accompanying any tape displacement detection means and tape displacement feedback means which drive up costs of the magnetic tape winding device.

BRIEF DESCRIPTION OF THE DRAWINGS

The foregoing and other objects and features of the present invention will be clearly understood from the following detailed description when reading with reference to the accompanying drawings in which.

DETAILED DESCRIPTION OF THE PREFERRED EMBODIMENTS

In the following description the term "roll length" shall means and refer to a rolled-up length of magnetic tape of a magnetic tape roll growing on a tape reel.

Figure 1:
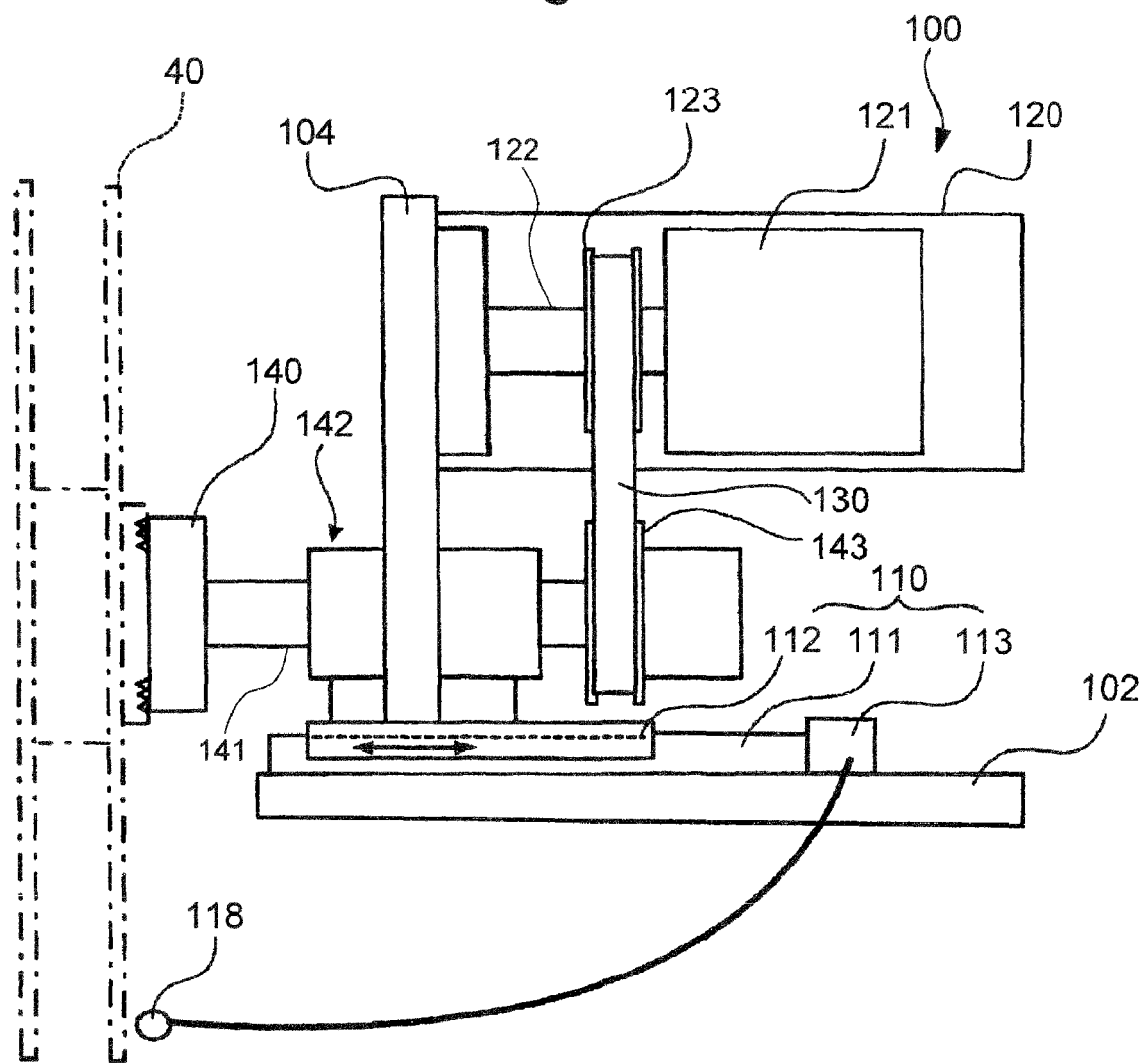
FIG. 1 is a side view in conceptual scheme of a tape winding apparatus according to an embodiment of the present invention.

Referring to the accompanying drawings in detail and, in particular, to FIG. 1 showing a magnetic tape feeding apparatus 100 of an embodiment of the present invention, the magnetic tape winding apparatus 100 comprises a slider unit 110 forming a tape winding mechanism and a drive unit 120. The slider unit 110, which is known in various forms and may take any form known to those skilled in the at, comprises a base 102 with a rail 111 provided thereon, a slider 112 movable in a horizontal direction (from the right side to the left side, and vise versa, as seen in FIG. 1) on the rail 111, a slider drive unit 113 for moving the slider 112, and a reel drive unit 142 fixedly mounted on the slider 112 for driving a tape reel 40. The reel drive unit 142 has a rotary shaft 141 with a coupling gear 140 having a permanent magnet embedded therein at one of opposite ends and a driven pulley 143 fixedly mounted to a rear portion close to the other end thereof. The tape reel 40 is coupled to the slider unit 110 through the coupling gear 140. The drive unit 120 is fixedly mounted on the reel drive unit 142 and provided with an electric motor 121 having a rotary shaft 122 with a drive pulley 123 fixedly mounted thereto. Rotation of the rotary shaft 122 of the electric motor 121 is connected to the rotary shaft 141 of the reel drive unit 142 through a drive belt 130 mounted between the drive pulleys 143 and the driven pulley 123. The tape winding mechanism may be formed by use of a positioning mechanism comprising an AC servo motor and a ball screw, a voice coil motor, a linear motor or the like which are well known to those skilled in the art.

The magnetic tape feeding apparatus 100 is provided with a roll length or quantitative displacement sensor 118 disposed in the close vicinity to the tape reel 40 for detecting a growth of a magnetic tape roll on the tape reel 40 approximately as large in size as the tape reel 40. The roll length sensor 118 is known in various forms such as a photo coupler, a volume detection element, a limit switch and a feed length detector for calculating a length of magnetic tape fed by a magnetic tape feeder and may take any form known to those skilled in the art. In the case of a photo coupler, it is preferred to dispose the photo coupler in a specified position in the close vicinity to tape reel so as to optically detect an outermost turn of a magnetic tape roll growing on the tape reel when the outermost turn comes level with the outer edge of the flange of the tape reel. Similarly, in the case of a limit switch, it is preferred to dispose the photo coupler in a specified position in the close vicinity to tape reel so as to mechanically detect an outermost turn of a magnetic tape roll growing on the tape reel when the outermost turn comes level with the outer edge of the flange of the tape reel. In the case of a capacity detection element, it is preferred to dispose the capacity detection element in a specified position in the close vicinity to a tape reel so as to detect a capacity change of the capacity detection element according to a growth of a magnetic tape roll on the tape reel. Further, in the case of winding length calculation means, it is preferred to use a revolution speed meter for detecting a predetermined number of revolutions of a tape reel.

In operation of the magnetic tape winding apparatus 100, the slider unit 110 is initially put in an home position calibrated 0.0 mm in a preparatory stage of winding. A tape reel 40 with a magnetizable metal plate embedded therein is magnetically attracted by the coupling gear 140 having a permanent magnet of the rotary shaft 141 of the reel drive unit 142 and coupled to the same. When the tape reel 40 is coupled to the rotary shaft 141 of the reel drive unit 142, the motor 121 is activated to rotate the rotary shaft 141 of the reel drive unit 142, and hence, the tape reel 40. Then, tape winding starts and progresses favorably, and a magnetic tape is wound and gradually forms a magnetic tape roll on the tape reel 4. When the magnetic tape roll grows in size or diameter as large as flanges of the tape reel 40, in other words, when an outermost turn of the growing magnetic tape roll comes level with outer edges of flanges of the tape reel 40, the roll length sensor 118 detects the magnetic tape and provides a signal for the slider drive unit 113. The signal causes the slider drive unit 113 to shift a position of the slider 112 by a slight distance less than for example 0.3 mm in either axial direction so as thereby to make an edge of the magnetic tape contiguous or subcontiguous to the either one of the flanges of the tape reel 40. When continuously making last several turns of the magnetic tape in this state, a magnetic tape roll is completed with the last several turns forming an annular peripheral lip portion laterally protruding at one side thereof. Then, the tape winding is terminated.

In this instance, after formation of the annular peripheral lip portion at one side, the slider drive unit 113 may cause the slider 112 to return to the home position and further to shift the slider 112 in position 0.3 mm in the other axial direction so as thereby to forming an annular peripheral lip portion laterally protruding at the other side thereof.

Figure 2:
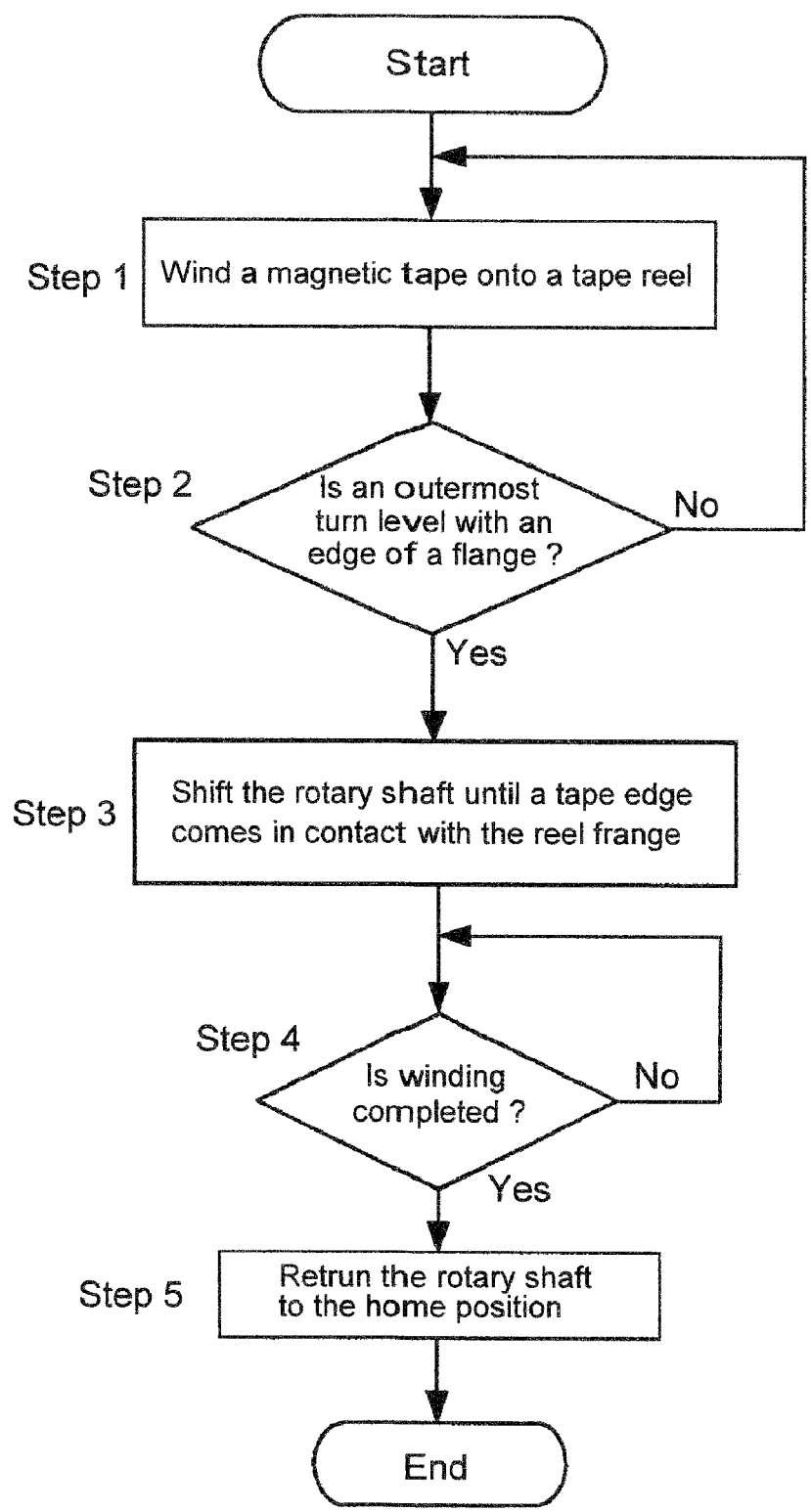
FIG. 2 is a flowchart illustrating sequential control of tape winding.

Referring to FIG. 2 illustrating a flowchart of sequential control of tape winding according to an embodiment of the present invention, when the control commences, the sequence logic proceeds to step S1 where the motor 121 of the drive unit 120 is activated to rotate the rotary shaft 141 of the reel drive unit 142, and hence, a tape reel 40 coupled to the coupling gear 140 of the rotary shaft 141 of the reel drive unit 142. Then, tape winding starts and progresses for winding a magnetic tape for forming a magnetic tape roll on the tape reel 40.

In step S2, when the roll length sensor 118 detects that the magnetic tape roll grows in size or diameter as large as flanges of the tape reel in growing process of a magnetic tape roll, the roll length sensor 118 provides a command signal for the slider drive unit 113. Then, in step S3, the slider drive unit 113 shifts the slider 112 in position in one axial direction until the magnetic tape at its edge is made contiguous or subcontiguous to the flange of the tape reel 40. During or after the shift of the slider 112, a predetermined numbers of turns of the magnetic tape are formed as an annular peripheral lip portion to complete a magnetic tape roll in step S4. Then, the slider drive unit 113 returns the slider 112 into the home position to terminate the control in step S5.

Figure 3A:
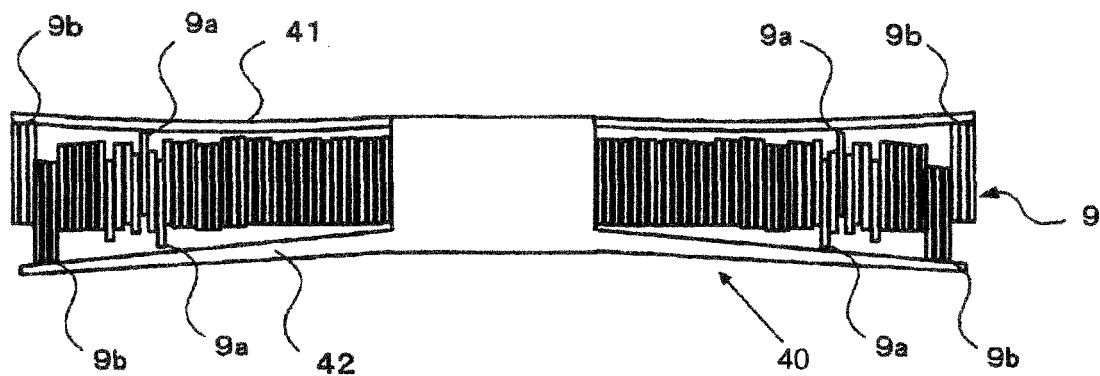
FIGS. 3A to 3C are longitudinal sectional views explaining various states of showing a magnetic tape roll formed on a tape reel.
Figure 3B:
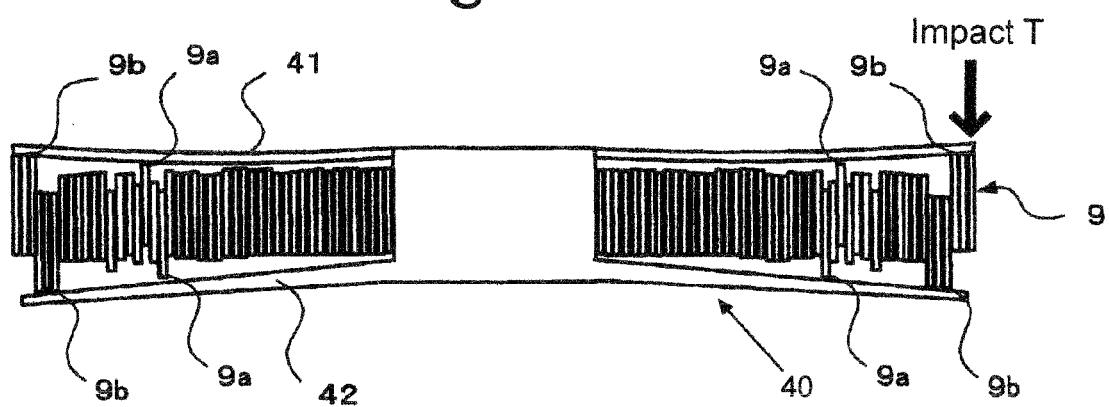
Figure 3C:
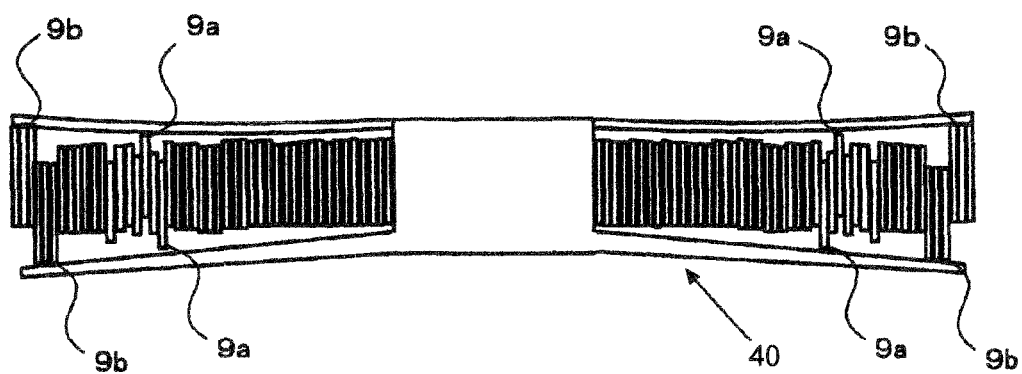
Figure 4:
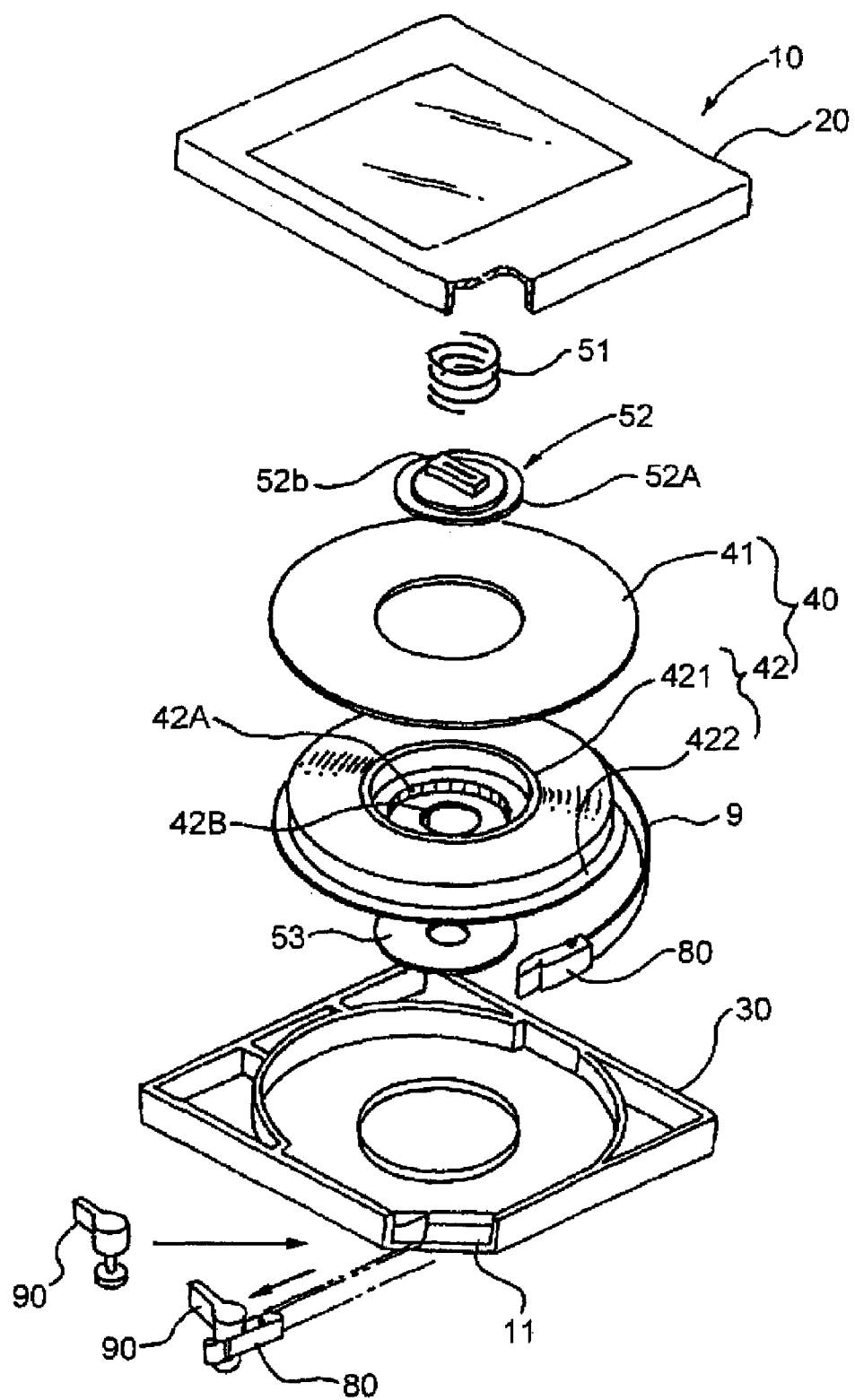
FIG. 4 is an exploded perspective view of a magnetic tape cartridge.

FIGS. 3A to 3C are explanatory views showing a tape reel with a magnetic tape roll wound thereon which is formed with annular peripheral lip portions formed at opposite sides thereof. As shown in FIG. 3A, lateral protruding irregular windings 9a are formed in a magnetic tape roll at opposite sides due to a change in tension following a decline in winding speed in growing process of the magnetic tape roll as before. However, when the roll length sensor 118 detects a growth of the magnetic tape roll to a size or diameter approximately as large as flanges of the tape reel 40, annular peripheral lip portions 9b are formed by shifting the rotary shaft 141 of the reel drive unit 142 in one axial direction and thereafter in the other axial direction until the magnetic tape at its edge is made contiguous or subcountiguous to one flange and then the other flange of the tape reel 40.

As shown in FIG. 3B, even if the magnetic tape cartridge 100 falls down against a horizontal surface G such as a floor or a ground with the tape reel 40 kept in a horizontal position and, as a result, the tape reel 40 receives strong impact T on the flange 41 from above through the annular peripheral lip portions 9b of the magnetic tape roll, the annular peripheral lip portions 9b prevents the flange 41 of the tape reel 40 from being greatly deflected in an axial direction of the reel hub 421 as conventional. Consequently, the lateral protruding irregular windings 9a of the magnetic tape roll which are low in rigidity are prevented from being hit at tape edges by the flanges of the tape reel 40 and therefore from causing on edge damages. Much the same is true on the flange 42 when the tape reel 40 receives strong impact T on the flange 42 from below through the annular peripheral lip portions 9b of the magnetic tape roll. As shown in FIG. 3C, the magnetic tape roll is kept in the same condition as before when eve though the upper flange 41 is relieved of the impact T. In the above embodiment, the tape reel may be naked as it is or encased in a cartridge case.

Figure 5:
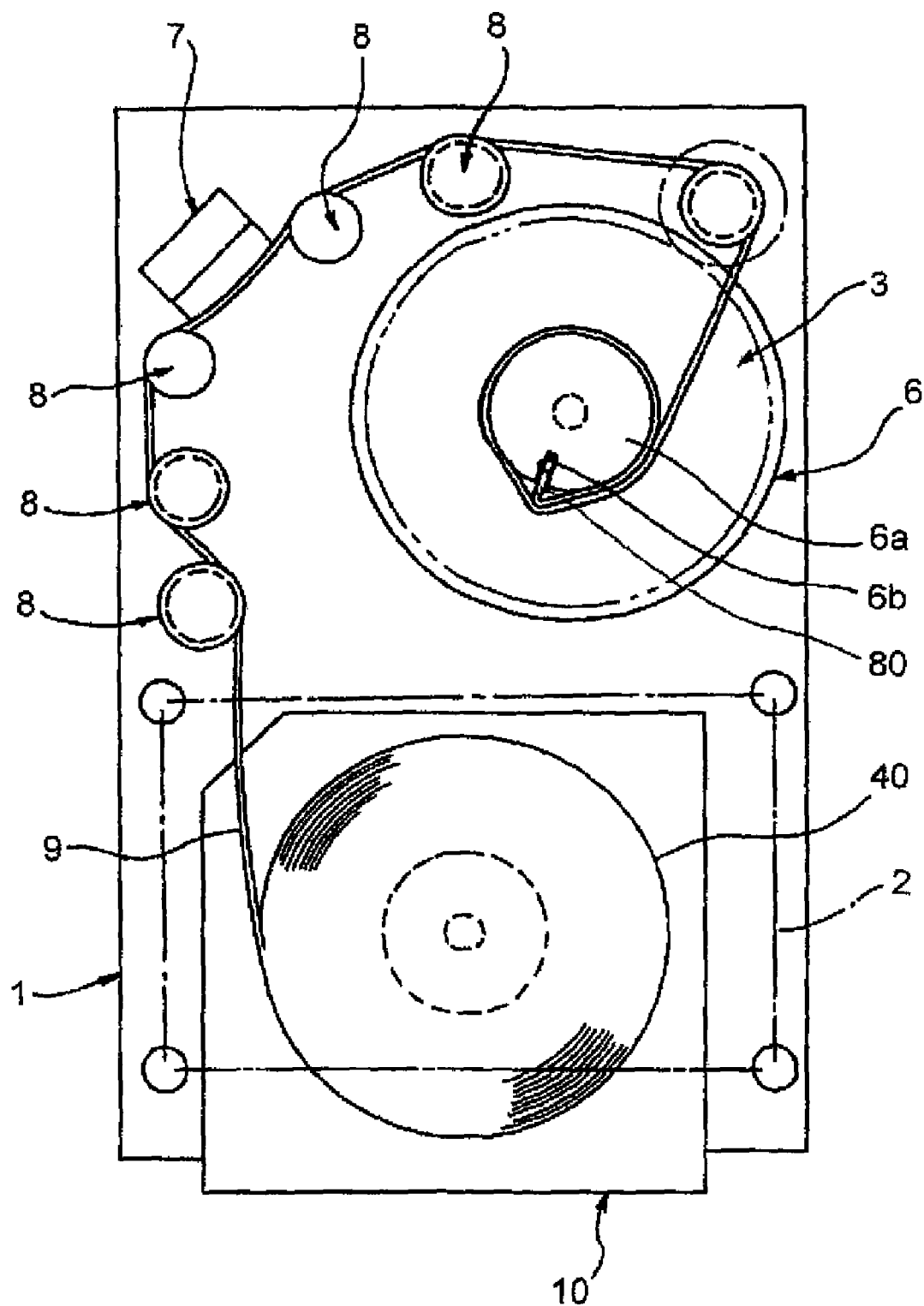
FIG. 5 is a schematic plan view of magnetic recording equipment for use with the magnetic tape cartridge shown in FIG. 4.
Figure 6A:
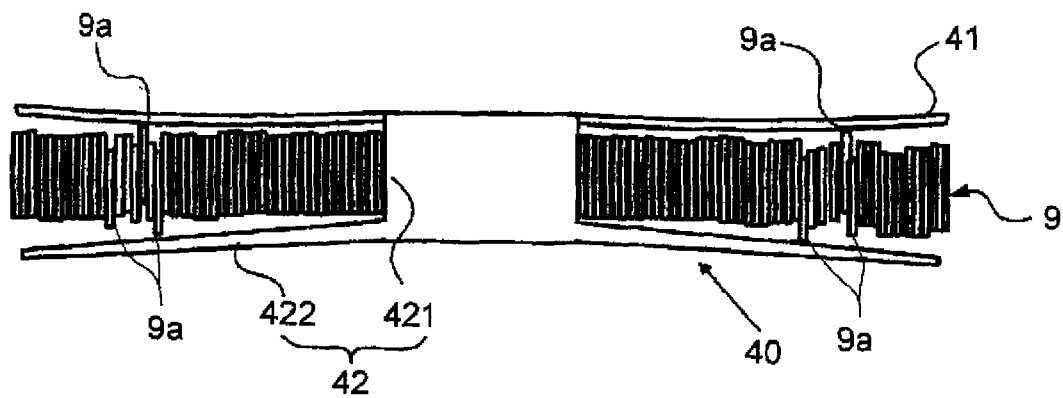
FIGS. 6A to 6C are longitudinal sectional views explaining a progress of an occurrence of edge damages of a magnetic tape roll formed on a tape reel due to lateral protruding irregular windings.
Figure 6B:
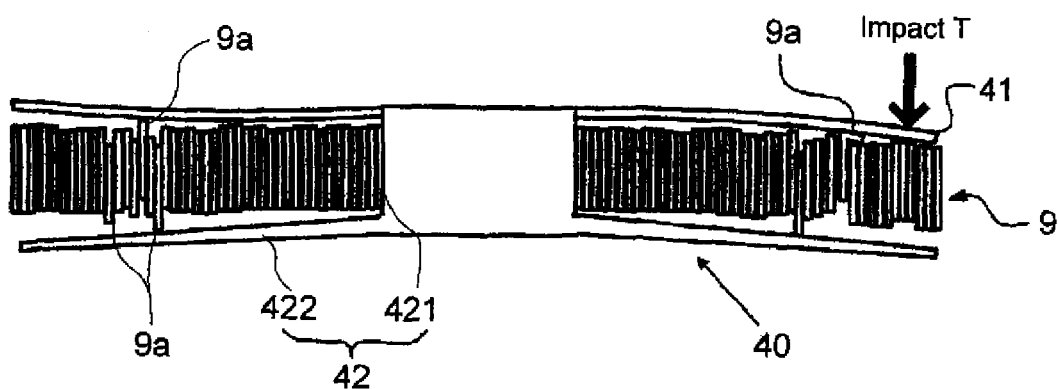
Figure 6C:
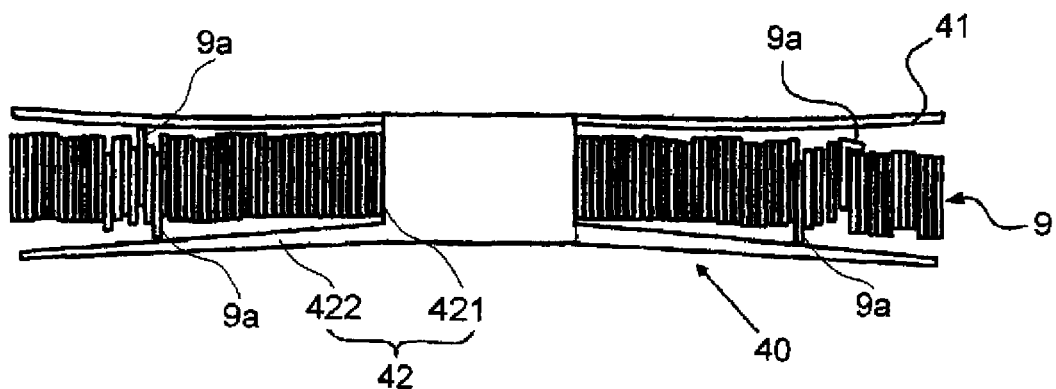
Figure 7:
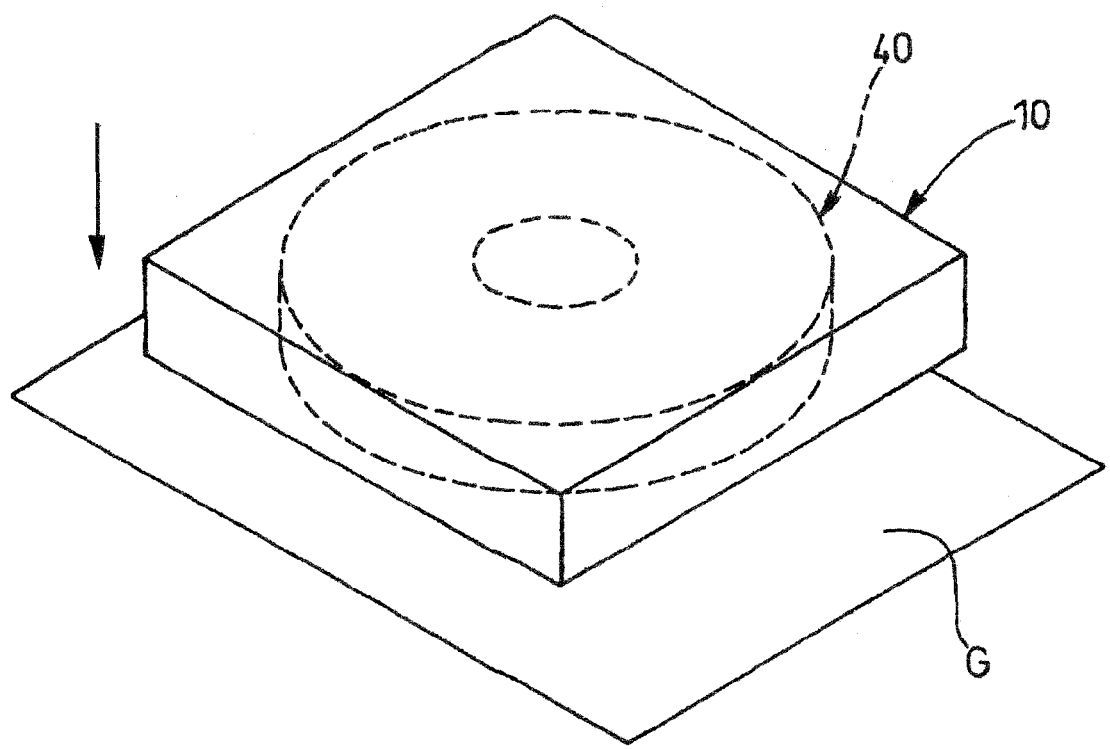
FIG. 7 is a perspective view explaining a fall of a magnetic tape cartridge on a horizontal plane in which edge damages occur in a magnetic tape roll.

As just described above, according to the present invention, the magnetic tape roll is provided with an annular peripheral lip portion with its edge made contiguous or subcontiguous to the flange of the tape reel 40 at least at one side thereof, lateral protruding irregular windings 9a of the magnetic tape roll are prevented from being hit by either flange of the tape reel 40 and still more prevented from causing edge damages. Therefore, the magnetic tape unwounded from the tape reel 40 in the magnetic tape cartridge 100 does not run into tracking errors when fed by the guide rollers 8 in the magnetic recording equipment 1 such as shown in FIG. 5.

As just described above, although it has been perceived as forbidden practice of prevention of irregular windings to shift the rotary shaft with a tape reel coupled thereto because axial movement of the rotary shaft causes waggles of the magnetic tape leading to irregular windings, contrary to the forbidden practice, the rotary shaft of the magnetic tape winding device of the present invention is shifted in a direction of tape width to force the magnetic tape to shift in position during rotation thereof until the magnetic tape at its edge is made contiguous or subcontiguous to a flange of the tape reel when a predetermined length of magnetic tape is wound onto the tape reel. This shift of the rotary shaft forms a predetermined number of turns of the magnetic tape in the form of an annular peripheral lip portion extending at one of opposite sides of a magnetic tape roll which prevents irregularly wound magnetic tapes protruding laterally from the side surface of the magnetic tape roll from damaged at tape edges by the flange of the tape reel.

It is also to be understood that although the present invention has been described with regard preferred embodiments thereof, various other embodiments and variants may occur to those skilled in the art which are within the scope and spirit of the invention, and such other embodiments and variants are intended to be covered by the following claims.

What is claimed is:

1. A magnetic tape winding apparatus for winding a magnetic tape onto a tape reel having flanges, said magnetic tape winding apparatus comprising:
   a rotary shaft movable in opposite axial directions thereof to which said tape reel is detachably coupled;
   driving means for driving said rotary shaft in a home position to wind said magnetic tape onto said tape reel;
   roll length detection means for detecting a roll length of magnetic tape roll growing on said tape reel; and
   shifting means for shifting an axial position of said rotary shaft in either said axial direction from said home position;
   wherein said shifting means shifts said rotary shaft in at least one of said opposite axial directions from said home position by a predetermined distance to additionally form a predetermined number of turns of said magnetic tape on a predetermined roll length of magnetic tape roll before termination of said winding of said magnetic tape onto said tape reel so as thereby to form an annular peripheral lip portion on at least one of opposite sides of said tape roll when said roll length detection means detects a predetermined roll length of magnetic tape roll, and said driving means is stopped when said predetermined number of turns of said magnetic tape are formed.

2. The magnetic tape winding apparatus as defined in claim 1, wherein said shifting means is caused to shift said rotary shaft from said home position in the other axial direction by said predetermined distance to additionally form a predetermined number of turns of said magnetic tape on said annular peripheral lip portion extending at said one side of said predetermined roll length of magnetic tape roll so as thereby to form another annular peripheral lip portion extending at the other side of said predetermined roll length of magnetic tape roll after formation of said annular peripheral lip portion extending at said one side of said predetermined roll length of magnetic tape roll.

3. The magnetic tape winding apparatus as defined in claim 1, wherein said roll length detection means detects an outermost turn of magnetic tape roll as said predetermined roll length of magnetic tape roll when coming level with an outer edge of said flange of said tape reel.

4. The magnetic tape winding apparatus as defined in claim 1, wherein said shifting means is caused to shift said rotary shaft from said home position while keeping rotation of said rotary shaft.

5. The magnetic tape winding apparatus as defined in claim 1, wherein said roll length (rolled-up tape length) detection means provides a signal with which said shift means is electrically activated to shift said rotary shaft when detecting said predetermined roll length of magnetic tape roll.

6. The magnetic tape winding apparatus as defined in claim 1, wherein said shift means comprises an electrically actuated slider to which said rotary shaft is mounted for rotation.

7. A method of winding a magnetic tape onto a tape reel having flanges, said magnetic tape winding method comprising the steps of:

driving a rotary shaft in home position to wind said magnetic tape onto a tape reel coupled to said rotary shaft;

shifting an axial position of said rotary shaft in either axial direction of a rotational axis of said rotary shaft from said home position by a predetermined distance to additionally form a predetermined number of turns of said magnetic tape on a predetermined roll length of magnetic tape roll while winding the magnetic tape onto the tape reel so as thereby to form an annular peripheral lip portion on at least one of opposite sides of said predetermined roll length of magnetic tape roll when detecting a predetermined roll length of magnetic tape roll growing on said tape reel; and stopping said rotary shaft when said predetermined number of turns of said magnetic tape are formed.

8. The magnetic tape winding method as defined in claim 7, wherein said rotary shaft is shifted from said home position in the other axial direction by said predetermined distance to additionally form a predetermined number of turns of said magnetic tape on said annular peripheral lip portion extending at said one side of said predetermined roll length of magnetic tape roll so as thereby to form another annular peripheral lip portion extending at the other side of said predetermined roll length of magnetic tape roll after formation of said annular peripheral lip portion extending at said one side of said predetermined roll length of magnetic tape roll.

9. The magnetic tape winding method as defined in claim 7, wherein said predetermined roll length of magnetic tape roll is detected by an outermost turn of magnetic tape roll coming level with an outer edge of said flange of said tape reel.

10. The magnetic tape winding method as defined in claim 7, wherein said rotary shaft is shifted from said home position while keeping rotation.

11. The magnetic tape winding method as defined in claim 7, wherein said annular peripheral lip portion has an edge either contiguous or subcontiguous to said flange of said tape reel.

12. A method of winding a magnetic tape onto a tape reel having flanges, comprising the steps of:

driving a rotary shaft to wind the magnetic tape onto the tape reel coupled to the rotary shaft;

shifting an axial position of the rotary shaft in a first axial direction of a rotational axis of the rotary shaft so that a first edge of the magnetic tape is directly adjacent a first one of the flanges of the tape reel;

first winding the magnetic tape onto the tape reel a first plurality of turns, wherein the first edge of the first plurality of turns of the magnetic tape is directly adjacent the first one of the flanges;

shifting an axial position of the rotary shaft in a second axial direction of the rotational axis of the rotary shaft opposite the first axial direction so that a second edge of the magnetic tape opposite the first edge is directly adjacent a second one of the flanges of the tape reel opposite the first flange;

second winding the magnetic tape onto the tape reel a second plurality of turns, wherein the second edge of the second plurality of turns of the magnetic tape is directly adjacent the second one of the flanges; and stopping the rotary shaft after the second winding step.

* * * * *